US012570875B2

(12) United States Patent
Schneiderman et al.

(10) Patent No.: US 12,570,875 B2
(45) Date of Patent: Mar. 10, 2026

(54) POLYMERS DERIVED FROM A POLY(TETRAHYDROFURAN)(METH)ACRYLATE MACROMER, ADHESIVE COMPOSITIONS, AND ARTICLES

(71) Applicant: 3M INNOVATIVE PROPERTIES COMPANY, St. Paul, MN (US)

(72) Inventors: Deborah K. Schneiderman, St. Paul, MN (US); Michael J. Maher, St. Paul, MN (US); Adam O. Moughton, Minneapolis, MN (US); Jennifer J. Sahlin, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 566 days.

(21) Appl. No.: 18/007,154

(22) PCT Filed: Jul. 21, 2021

(86) PCT No.: PCT/IB2021/056582

§ 371 (c)(1),
(2) Date: Jan. 27, 2023

(87) PCT Pub. No.: WO2022/043784

PCT Pub. Date: Mar. 3, 2022

(65) Prior Publication Data

US 2023/0235199 A1 Jul. 27, 2023

Related U.S. Application Data

(60) Provisional application No. 62/706,596, filed on Aug. 27, 2020.

(51) Int. Cl.
*C09J 7/38* (2018.01)
*C09J 133/10* (2006.01)

(52) U.S. Cl.
CPC ............. *C09J 7/385* (2018.01); *C09J 133/10* (2013.01); *C09J 2203/326* (2013.01); *C09J 2301/302* (2020.08); *C09J 2301/312* (2020.08)

(58) Field of Classification Search
CPC .... C09J 7/385; C09J 133/10; C09J 2203/326; C09J 2301/302; C09J 2301/312; C09J 151/003; C09J 151/08; C09J 4/06; C08F 265/06; C08F 290/062; C08F 220/1808; C08F 220/1804; C08F 220/06; C08F 220/1811; C08F 222/102
See application file for complete search history.

(56) References Cited

U.S. PATENT DOCUMENTS

| | | | | |
|---|---|---|---|---|
| 4,412,063 A | * | 10/1983 | Heitz | C08G 65/20 |
| | | | | 560/209 |
| 8,440,304 B2 | | 5/2013 | Paul et al. | |
| 9,040,155 B2 | | 5/2015 | Ha et al. | |
| 9,493,684 B2 | | 11/2016 | Saitou | |
| 10,134,566 B2 | | 11/2018 | David et al. | |
| 2013/0260148 A1 | | 10/2013 | Kataoka et al. | |
| 2017/0002236 A1 | | 1/2017 | Papenbroock et al. | |
| 2020/0157386 A1 | | 5/2020 | Kim et al. | |

FOREIGN PATENT DOCUMENTS

| | | |
|---|---|---|
| CN | 104694037 B | 1/2017 |
| JP | 2009114382 A | 5/2009 |
| JP | 2013216739 A | 10/2013 |
| JP | 2019116547 A | 7/2019 |
| WO | 2020066842 A1 | 4/2020 |
| WO | 2020162518 A1 | 8/2020 |
| WO | 2020250066 A1 | 12/2020 |

OTHER PUBLICATIONS

English translation CN104691037A (Year: 2015).*
English translation JP2019116547A (Year: 2019).*
English translation WO2020066842A1 (Year: 2020).*
English translation WO2020162518A1 (Year: 2020).*
Dubreuil, "Endgroup-functionalized polytetrahydrofurans by polymerization with functional triflate esters, 1. PolyTHF-macromonomers", Macro-molecular Chemistry & Physics, 1997, vol. 198, No. 10, pp. 3077-3087.
Dubreuil, "Influence of the alkyl group of triflate esters on their initiation ability for the cationic ring-opening polymerization of tetrahydrofuran", Macromolecular Rapid Communications, 1999, vol. 20, No. 7, pp. 383-386.
International Search Report for PCT International Application No. PCT/IB2021/056582, mailed on Oct. 20, 2021, 3 pages.
Lequieu, "Solid state NMR study of segmented polymer networks: fine-tuning of phase morphology via their molecular design", Polymer, 2004, vol. 45, pp. 7943-7951.
Oike, "Bis(triflate ester)s Having an Additional Functional Group: Initiators for the Preparation of a,ω,kentro-Telechelic Poly(THF)s", Macromolecules, 2000, vol. 33, No. 23, pp. 8898-8903.
Orekhov, "Features of the acid-catalyzed hydrolysis of mono-and poly(ethylene glycol) methacrylates", European Polymer Journal, 2018, vol. 100, pp. 18-24.
Takahashi, "Isothermal Crystallization of End-Linked Poly(tetrahydrofuran) Networks. 2. Molecular Weight Dependence Macromolecules", 1995, vol. 28, No. 16, pp. 5547-5553.
Tsuchiya, "Melting behavior of poly(tetrahydrofuran)s and their blends", Journal of Thermal Analysis and Calorimetry, 2003, vol. 72, No. 2, pp. 651-655.

* cited by examiner

*Primary Examiner* — Alicia Bland

(57) ABSTRACT

An adhesive composition that contains two polymeric materials, a method of making the adhesive composition, and an article that contains the adhesive composition are provided. One of the polymeric materials is derived from a (meth) acrylate macromer having a poly(tetrahydrofuran) group. The articles include a layer of the adhesive composition positioned next to a substrate. The articles can be, for example, an adhesive tape or can be part of another article such as, for example, an electronic device that is impact resistant and/or flexible.

12 Claims, No Drawings

POLYMERS DERIVED FROM A POLY(TETRAHYDROFURAN)(METH)ACRYLATE MACROMER, ADHESIVE COMPOSITIONS, AND ARTICLES

CROSS REFERENCE TO RELATED APPLICATIONS

This application is a national stage filing under 35 U.S.C. 371 of PCT/IB2021/056582, which claims the benefit of U.S. Provisional Patent Application No. 62/706,596, filed Aug. 27, 2020, the disclosure of which is incorporated by reference in its/their entirety herein.

BACKGROUND

In electronic devices, particularly mobile electronic devices (e.g., handheld or wearable electronic devices), pressure sensitive adhesives (PSAs) are typically used to bond the cover glass (or lens) to the underlying display module, bond the touch sensor to the cover glass and the display, or bond the lower components of the display to the housing. The pressure-sensitive adhesives used in mobile electronic devices are usually optically clear adhesives (OCAs). For these applications (commonly referred to as electronics bonding, or e-bonding), PSAs and OCAs should have an adhesive strength that is sufficiently strong to properly maintain good adhesion to those components, not only when the mobile electronic devices are operating under normal conditions, but also when they are deformed by external forces (e.g., bending, folding, flexing), subjected to traumatic forces (e.g., dropping of the mobile electronic device onto a hard surface) or subjected to extreme environmental conditions (e.g. high temperatures and/or high humidity conditions). Regarding deformation, the components of the electronic devices may be deformed when a user sits in a chair while the electronic device is in their pocket or presses down on the electronic device with their hips. Under such conditions, the pressure sensitive adhesives should have strength of adhesion sufficient to maintain the adhesion to, for example, the cover glass (sometimes referred to as anti-lifting properties). Regarding traumatic forces, the pressure sensitive adhesives should have sufficient drop/impact resistance such that the pressure sensitive adhesive maintains adhesion of the components even when large instantaneous impacts are applied to the mobile electronic device when dropped.

Adhesives that can dissipate energies and resist delamination forces associated with high strain events (e.g., flexing and folding) and high strain rate events, such as that experienced during a device drop, have gained increasing significance for the electronic device industry. The ability to produce pressure sensitive adhesives that resist de-bonding (via interfacial or cohesive failure modes) during these high impact and dynamic deformations has become a highly desired property, inclusive of traditional performance metrics such as good peel strength, shear strength, tensile adhesion, and creep resistance, amongst others, and thus has become a commercially attractive performance criterion for continued product differentiation within this competitive and fast paced market space.

Given the electronics industry's trend towards device simplification (i.e., combining layers and/or layer functions) and reducing bonding area and overall device thickness, (and moreover demanding enhanced flexibility), there exists a growing need for adhesive tapes that have good impact resistance, compliance, and recovery. Adhesives having this balance of dichotomous properties are needed.

SUMMARY

An adhesive composition that contains two polymeric materials, a method of making the adhesive composition, and an article that contains the adhesive composition are provided. One of the polymeric materials in the adhesive composition is derived from a (meth)acrylate macromer having a poly(tetrahydrofuran) group. The articles include a layer of the adhesive composition positioned next to a substrate. The articles can be, for example, an adhesive tape or can be part of another article such as, for example, an electronic device that is impact resistant and/or flexible.

In a first aspect, an adhesive composition is provided that contains 0.5 to 20 weight percent of a first (meth)acrylate polymer and 80 to 99.5 weight percent of a second (meth)acrylate polymer based on a total weight of (meth)acrylate polymers in the adhesive composition. The first (meth)acrylate polymer has a weight average molecular weight of at least 300,000 Daltons and is a polymerized product of a first polymerizable composition comprising (1) an alkyl (meth)acrylate and (2) an optional polar monomer. The second (meth)acrylate polymer is crosslinked and is a polymerized product of a second polymerizable composition comprising (1) an alkyl (meth)acrylate, (2) a polar monomer, (3) a poly(tetrahydrofuran) (meth)acrylate macromer, and (4) a crosslinking monomer having a plurality of (meth)acryloyl groups.

In a second aspect, a method of making an adhesive composition is provided. The method includes providing a first polymerizable composition that comprises (1) an alkyl (meth)acrylate and (2) an optional polar monomer. The method further includes forming a syrup composition by partially polymerizing the first polymerizable composition. The syrup composition contains (a) 1 to 20 weight percent solute polymer, which is a first (meth)acrylate polymer, and (b) 80 to 99 weight percent solvent monomers based on a total weight of the syrup composition, wherein the solvent monomers comprise (i) the alkyl (meth)acrylate and (ii) the optional polar monomer. The solute polymer has a weight average molecular weight of at least 300,000 Daltons. The method yet further includes preparing a second polymerizable composition comprising (a) the syrup composition, (b) a polar monomer if the syrup composition is free of the optional polar monomer, (c) a poly(tetrahydrofuran) (meth) acrylate macromer, and (d) a crosslinking monomer having a plurality of (meth)acryloyl groups. The method still further includes polymerizing the second polymerizable composition to form an adhesive composition comprising the first (meth)acrylate polymer plus a second (meth)acrylate polymer that is crosslinked.

In a third aspect, an adhesive composition is provided that contains a polymerized product of a second polymerizable composition comprising (a) a syrup composition that is a partially polymerized reaction product of a first polymerizable composition comprising (i) an alkyl (meth)acrylate and (ii) an optional polar monomer, (b) a polar monomer if the syrup composition is free of the optional polar monomer, (c) a poly(tetrahydrofuran) (meth)acrylate macromer, and (d) a crosslinking monomer having a plurality of (meth)acryloyl groups. The syrup composition contains (1) 1 to 20 weight percent solute polymer that is a first (meth)acrylate polymer having a weight average molecular weight of at least 300, 000 Daltons and (2) 80 to 99 weight percent solvent monomers comprising (i) the alkyl (meth)acrylate and (ii) the optional polar monomer. The polymerized product of the second polymerizable composition is the adhesive composition comprising the first (meth)acrylate polymer and a crosslinked second (meth)acrylate polymer.

In a fourth aspect, an article is provided that includes a substrate and an adhesive composition positioned adjacent to a substrate. The adhesive composition is described above in the first or third aspect.

The term "and/or" such as in the expression A and/or B means A alone, B alone, or both A and B.

The term "polymer" refers to homopolymers, copolymers, terpolymers, and the like.

The term "polymerizable component" refers to a compound that can undergo polymerization (i.e., the compound has a polymerizable group). The polymerizable component typically has an ethylenically unsaturated group such as a (meth)acryloyl group or a vinyl group that is the polymerizable group. The compound that has a polymerizable group can be referred to as a "monomer". The term "macromer" refers to a monomer having a polymeric group. A macromer is a subset of monomers.

The term "polymerizable composition" typically refers to a reaction mixture that includes the polymerizable components plus any other material such as a free radical initiator, chain transfer agent, antioxidant, plasticizer, tackifier, non-reactive organic solvent, filler, and the like that may be present during the polymerization process. The polymerizable composition may contain materials that do not undergo a reaction such as a non-reactive organic solvent or a polymeric material that does not undergo additional polymerization.

The term "monomeric unit" refers to the reaction product of a polymerizable component (i.e., a monomer (including a macromer)) within the (meth)acrylate polymer. As an example, the monomeric unit of acrylic acid $$H_2C=CH$$

where the asterisks (*) indicate the attachment site to another group such as another monomeric unit or terminal group in the (meth)acrylate polymer.

The term "(meth)acryloyl" refers to a group of formula $CH_2=CR—(CO)—$ where R is hydrogen (for an acryloyl group) or methyl (for a methacryloyl group).

The term "(meth)acrylate" refers to a methacrylate and/or acrylate. Likewise, the term (meth)acrylic acid" refers to methacrylic acid and/or acrylic acid and the term "(meth) acrylamide" refers to methacrylamide and/or acrylamide.

The term "poly(tetrahydrofuran) (meth)acrylate macromer" refers to a monomer having a single (meth)acryloyloxy group (i.e., a group of formula $CH_2=CR—(CO)—O—$ where R is hydrogen or methyl) plus a poly(tetrahydrofuran) group that contains at least three $—(C_4H_8O)—$ groups. The term "poly(tetrahydrofuran)" can be used interchangeably with the terms "poly(tetramethylene oxide)" and "poly(tetramethylene glycol)". The abbreviation "PTHF (meth)acrylate macromer" is used herein to refer to the poly(tetrahydrofuran) (meth)acrylate macromer.

The term "vinyl" refers to a polymerizable component that has a group $CH_2=CH—$ but that is not part of a (meth)acryloyl group.

The term "syrup" refers to a composition that contains both unreacted monomers and a polymerized product of the monomers. The polymerized product can be referred to as a "solute polymer", and it is dissolved in the monomers. That is, the monomers function as a solvent for the polymerized product and can be referred to as "solvent monomers". The syrup usually contains little or no other solvent such as a non-reactive organic solvent. The syrup is typically present as a homogeneous mixture with any liquids being miscible with each other.

The term "pressure-sensitive adhesive" or "PSA" is used herein in its conventional manner according to the Pressure-Sensitive Tape Council, which states that pressure-sensitive adhesives are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). Central to all PSAs is a desired balance of adhesion and cohesion that is often achieved by optimizing the physical properties of the elastomer, such as glass transition temperature and modulus. For example, if the glass transition temperature ($T_g$) or modulus of the elastomer is too high and above the Dahlquist criterion for tack (storage modulus of $3×10^6$ dynes/cm² at room temperature and oscillation frequency of 1 Hz), the material will not be tacky and is not useful by itself as a PSA material.

Herein, the term "glass transition temperature", which can be written interchangeably as "$T_g$", of a monomer (including the PTHF (meth)acrylate macromer) refers to the glass transition temperature of the homopolymer formed from the monomer, which can be a macromer. The glass transition temperature for a polymeric material is typically measured by Dynamic Mechanical Analysis (DMA) as the maximum tan delta (δ).

As used herein, the term "flexible" refers to a substrate and/or article that can undergo a roll up action with a bend radius of 200 mm or less, 100 mm or less, 50 mm or less, 20 mm or less, 10 mm or less, 5 mm or less, 4 mm or less, 3 mm or less, 2 mm or less, or 1 mm or less, without failure or visible defects, such as delamination, cracking, crazing, or haze.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other claims may also be preferred, under the same or other circumstances. Furthermore, the recitation of one or more preferred claims does not imply that other claims are not useful and is not intended to exclude other claims from the scope of the disclosure.

In this application, terms such as "a," "an," and "the" are not intended to refer to only a singular entity but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all the listed elements or a combination of any two or more of the listed elements.

Also, herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also, herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C. or 22° C. to 25° C.

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

When a group is present more than once in a formula described herein, each group is "independently" selected, whether specifically stated or not. For example, when more than one R group is present in a formula, each R group is independently selected.

Reference throughout this specification to "one embodiment," "an embodiment," "certain embodiments," or "some embodiments," etc., means that a specific feature, configuration, composition, or characteristic described in connection with the embodiment is included in at least one embodiment of the invention. Thus, the appearances of such phrases in various places throughout this specification are not necessarily referring to the same embodiment of the invention. Furthermore, the specific features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples. These examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION

The present disclosure provides an adhesive composition that includes two different polymeric materials and an article that contains the adhesive composition positioned adjacent to a substrate. The articles can be, for example, an adhesive tape or can be part of another article such as an electronic device. The adhesive composition typically has good impact resistant properties and/or flexibility.

The two polymeric materials are both (meth)acrylate polymers. As used herein, the term "(meth)acrylate polymer" refers to a polymeric material that is formed from a monomer composition that is at least 50 mole percent (meth)acrylate monomers based on total moles of monomers in the polymerizable composition. For example, at least 60 mole percent, at least 70 mole percent, at least 80 mole percent, at least 90 mole percent, at least 95 mole percent, at least 98 mole percent, or at least 99 mole percent of the monomers used to form the two polymeric materials are (meth)acrylate monomers.

The first (meth)acrylate polymer is derived from a first polymerizable composition that contains an alkyl (meth) acrylate and an optional polar monomer. The second (meth) acrylate polymer is derived from a second polymerizable composition that includes an alkyl (meth)acrylate, a polar monomer, a PTHF (meth)acrylate macromer, and a crosslinking agent having a plurality of (meth)acryloyl groups. The second (meth)acrylate polymer is often prepared in the presence of the first (meth)acrylate polymer. The second (meth)acrylate polymer is typically crosslinked but the first (meth)acrylate polymer is typically not crosslinked.

The adhesive composition can optionally include other components in addition to the first and second (meth) acrylate polymers. The adhesive composition is typically a pressure-sensitive adhesive.

The adhesive composition can be used in the preparation of various articles. The adhesive composition desirably has good peel adhesive strength and remains adhered to a substrate even when the article is flexed, folded, impacted, or exposed to adverse environmental conditions. In some embodiments, the adhesive composition is used in an electronic device including those that are flexible and/or that can withstand an impact such as dropping.

In some embodiments, the process of making the adhesive composition includes preparing the first (meth)acrylate polymer by partially polymerizing a first polymerizable composition to form a syrup composition. The syrup composition contains a solute polymer, which is the first (meth) acrylate polymer, dissolved in solvent monomers. The solvent monomers are the unreacted polymerizable components of the first polymerizable composition that includes (a) an alkyl (meth)acrylate and (b) an optional polar monomer. After formation of the first (meth)acrylate polymer, the following monomers are added to the syrup composition to form a second polymerizable composition: a PTHF (meth)acrylate macromer, a polar monomer if the syrup composition is free of the optional polar monomer (or if additional polar monomer is desired), and a crosslinking agent having a plurality of (meth)acryloyl groups. That is, the second polymerizable composition contains the first (meth)acrylate polymer, an alkyl (meth)acrylate, a polar monomer, a PTHF (meth)acrylate macromer, and a crosslinking agent having a plurality of (meth)acryloyl groups. When polymerization is initiated, a second (meth)acrylate polymer is formed in the presence of the first (meth)acrylate polymer. During the second polymerization reaction, the first (meth)acrylate polymer typically does not undergo further polymerization. The product is an adhesive composition that contains the first (meth)acrylate polymer and the crosslinked second (meth)acrylate polymer.

First Polymerizable Composition

The first (meth)acrylate polymer is formed from the first polymerizable composition that includes an alkyl (meth) acrylate and an optional polar monomer. Other optional monomers can be included in the first polymerizable composition. The first polymerizable composition is usually only partially polymerized. Thus, the product of the first polymerizable composition is a syrup composition that contains (a) a syrup polymer that is a first (meth)acrylate polymer and (b) unreacted solute monomers.

Any suitable alkyl (meth)acrylate or mixture of alkyl (meth)acrylates can be used in the first polymerizable composition. The choice of the alkyl (meth)acrylate can influence the glass transition temperature of the final adhesive composition. Some alkyl (meth)acrylate monomers are classified as low $T_g$ monomers based on the glass transition temperature of their corresponding homopolymers. The low $T_g$ monomers, as measured from the corresponding homopolymers, often have a $T_g$ no greater than 20 degrees Celsius, no greater than 10 degrees Celsius, no greater than 0 degrees Celsius, or no greater than –10 degrees Celsius. Other alkyl (meth)acrylates are classified as high $T_g$ monomers based on the glass transition temperature of the corresponding homopolymers. The high $T_g$ monomers, as measured from the corresponding homopolymers, often have a $T_g$ greater than 30° C., greater than 40° C., or greater than 50° C. The glass transition temperature if often measured using Dynamic Mechanical Analysis (DMA).

Suitable low $T_g$ alkyl (meth)acrylate monomers include, but are not limited to, non-tertiary alkyl acrylates but can be an alkyl (meth)acrylates having a linear alkyl group with at least 4 carbon atoms. Specific examples of alkyl (meth) acrylates include, but are not limited to, n-butyl acrylate, n-butyl methacrylate, isobutyl acrylate, sec-butyl acrylate, n-pentyl acrylate, 2-methylbutyl acrylate, n-hexyl acrylate, cyclohexyl acrylate, 4-methyl-2-pentyl acrylate, 2-methylhexyl acrylate, 2-ethylhexyl acrylate, n-octyl acrylate, 2-octyl acrylate, isooctyl acrylate, isononyl acrylate, isoamyl acrylate, n-decyl acrylate, isodecyl acrylate, n-decyl methacrylate, lauryl acrylate, isotridecyl acrylate, n-octadecyl acrylate, isostearyl acrylate, n-dodecyl methacrylate, and combinations thereof. The alkyl (meth)acrylate monomers are typically selected to include at least one low $T_g$ monomer such as those that have a $T_g$ no greater than –10 degrees Celsius when measured as a homopolymer. Such alkyl monomers include, but are not limited to, 2-ethylhexyl acrylate, isooctyl acrylate, N-butyl acrylate, 2-methylbutyl acrylate, iso-octyl acrylate, 2-octyl acrylate, and combinations thereof.

Some suitable high $T_g$ alkyl (meth)acrylate monomers include, for example, methyl methacrylate, ethyl methacrylate, n-propyl methacrylate, isopropyl methacrylate, n-butyl methacrylate, isobutyl methacrylate, sec-butyl methacrylate, tert-butyl (meth)acrylate, cyclohexyl methacrylate, isobornyl (meth)acrylate, stearyl (meth)acrylate, and 3,3,5 trimethylcyclohexyl (meth)acrylate.

The total amount of the alkyl (meth)acrylate can be any amount up to 100 weight percent or up to 99 weight percent based on the total weight of monomers within the first polymerizable composition. The amount can be, for example, up to 98 weight percent, up to 97 weight percent, up to 95 weight percent, up to 92 weight percent, up to 90 weight percent, up to 85 weight percent, or up to 80 weight percent. The lower amount is often at least 60 weight percent, at least 65 weight percent, at least 70 weight percent but can be lower if optional monomers are included in the first polymerizable composition. The amount of the alkyl (meth)acrylate is often at least 75 weight percent, at least 80 weight percent, at least 85 weight percent, or at least 90 weight percent.

In addition to the alkyl (meth)acrylate, the first polymerizable composition optionally contains a polar monomer. The polar monomer contains an ethylenically unsaturated group plus a polar group. The ethylenically unsaturated group is either a vinyl or (meth)acryloyl group. Suitable polar groups can be an acidic group, a hydroxyl group, an ether (or polyether) group, or a nitrogen-containing group. The nitrogen-containing group is typically a primary amido group, secondary amido group, tertiary amido group, or amino group. While the polar monomer is optional in the first polymerizable composition, it is usually present.

While acidic polar monomers can have any suitable acidic group such as a sulfonic acid group, phosphonic acid group, or carboxylic acid group, the acidic group is often a carboxylic acid group. Exemplary polar monomers with a carboxylic acid group include those selected from (meth) acrylic acid, p-carboxyethyl (meth)acrylate, 2-(meth)acryloyloxyethyl phthalic acid, 2-(meth)acryloyloxy succinic acid, and combinations thereof. In many embodiments, the polar monomer with an acidic group is (meth)acrylic acid and is often acrylic acid. Depending on the pH, the acidic polar monomers can be in the form of a salt.

Exemplary polar monomers with a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), hydroxyalkyl (meth)acrylamides (e.g., 2-hydroxyethyl (meth)acrylamide or 3-hydroxypropyl (meth)acrylamide), ethoxylated hydroxyethyl (meth) acrylate (e.g., monomers commercially available from Sartomer (Exton, PA, USA) under the trade designation CD570, CD571, and CD572), aryloxy substituted hydroxyalkyl (meth)acrylates (e.g., 2-hydroxy-2-phenoxypropyl (meth)acrylate), and hydroxy-propyl-carbamate acrylate.

Exemplary ether-containing polar monomers include those selected from 2-ethoxyethoxyethyl (meth)acrylate, 2-methoxyethoxyethyl (meth)acrylate, di(ethylene glycol)-2-ethylhexyl-ether acrylate, ethylene glycol-methyl ether acrylate, and combinations thereof. Suitable ether-containing (meth)acrylate monomers have a number average molecular weight less than 350 Daltons, less than 300 Daltons, or less than 250 Daltons.

Exemplary polar monomers with a primary amido group include (meth)acrylamide. Exemplary polar monomers with secondary amido groups include, but are not limited to, N-alkyl (meth)acrylamides and N-alkoxyalkyl (meth)acrylamides such as N-methyl (meth)acrylamide, N-ethyl (meth) acrylamide, N-isopropyl (meth)acrylamide, and N-octyl (meth)acrylamide, N-(3-methoxypropyl)acrylamide, and N-(isobutoxymethyl)acrylamide. Exemplary polar monomers with a tertiary amido group include, but are not limited to, N-vinyl carbazole, N-vinyl caprolactam, N-vinyl-2-pyrrolidone, N-vinyl azlactone, 4-(meth)acryloylmorpholine, N-vinylimidazole, ureido (meth)acrylate, and N,N-dialkyl (meth)acrylamides such as N,N-dimethyl (meth)acrylamide, N,N-diethyl (meth)acrylamide, N,N-dipropyl (meth)acrylamide, and N,N-dibutyl (meth)acrylamide.

Polar monomers with an amino group include various N,N-dialkylaminoalkyl (meth)acrylates and N,N-dialkylaminoalkyl (meth)acrylamides. Examples include, but are not limited to, N,N-dimethyl aminoethyl (meth)acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth)acrylate, N,N-diethylaminoethyl (meth)acrylamide, N,N-diethylaminopropyl (meth)acrylate, and N,N-diethylaminopropyl (meth)acrylamide.

The first polymerizable composition can include 0 to 40 weight percent polar monomer. This amount is often no greater than 35 weight percent, no greater than 30 weight percent, no greater than 25 weight percent, no greater than 20 weight percent, no greater than 15 weight percent, no greater than 10 weight percent, or no greater than 5 weight percent based on a total weight of polymerizable components. If present, the amount of the polar monomer or mixtures thereof is often at least 0.1 weight percent, at least 0.5 weight percent, at least 1 weight percent, at least 2 weight percent, at least 5 weight percent, or at least 10 weight percent based on a total weight of monomers in the first polymerizable composition.

The polar monomer can be an acidic monomer, a non-acidic monomer, or a combination thereof. If the first polymerizable composition includes acidic polar monomer, the amount of the acidic polar monomer is usually present in an amount no great than 15 weight percent based on a total weight of monomers in the first polymerizable composition. Typically, if more than 15 weight percent of this acidic polar monomer is used, the resultant adhesive composition may be too stiff. The amount is often no greater than 12 weight percent, no greater than 10 weight percent, no greater than 8 weight percent, no greater than 6 weight percent, no greater than 5 weight percent, no greater than 4 weight percent, no greater than 3 weight percent, or no greater than 2 weight percent and at least 0.5 weight percent, at least 1 weight percent, at least 2 weight percent, or at least 3 weight percent based on the total weight of monomers in the first polymerizable composition.

If desired, the polar monomer can include both an acidic polar monomer and a non-acidic polar monomer and up to 40 weight percent of the combined polar monomers can be used based on the total weight of monomers in the first polymerizable composition. In some examples, the polar monomer includes 1 to 15 weight percent acidic polar monomer and 1 to 25 weight percent non-acidic polar monomer. For example, first polymerizable composition often includes both an acidic polar monomer and a nitrogen-containing polar monomer (e.g., a polar monomer with a primary amido group, a secondary amido group, a tertiary amido group, or an amino group). This combination of polar monomers can provide an adhesive composition that has excellent high impact resistance, and/or drop resistance properties, and excellent bond making ability (i.e., good tack, instant bond formation). These performance criteria are often highly desirable for applications within e-bonding and industrial market segments.

The first polymerizable composition often contains 60 to 100 weight percent alkyl (meth)acrylate and 0 to 40 weight percent polar monomer based on a total weight of polymerizable components in the first polymerizable composition. In many embodiments, the first polymerizable composition contains 60 to 99 weight percent alkyl (meth)acrylate and 1 to 40 weight percent polar monomer or 70 to 99 weight percent alkyl (meth)acrylate and 1 to 30 weight percent polar monomer. For example, the first polymerizable composition can include 70 to 95 weight percent alkyl (meth) acrylate and 5 to 30 weight percent polar monomer, 80 to 99 weight percent alkyl (meth)acrylate and 1 to 20 weight percent polar monomer, 80 to 95 weight percent alkyl (meth)acylate and 5 to 20 weight percent polar monomer, 85 to 95 weight percent alkyl (meth)acrylate and 1 to 15 weight percent polar monomer, 85 to 95 weight percent alkyl (meth)acylate and 5 to 15 weight percent polar monomer, or 80 to 90 weight percent alkyl (meth)acylate and 10 to 20 weight percent polar monomer. If the polar monomer includes an acidic monomer, the amount of the acidic monomer can be 1 to 15 weight percent. For example, if there is 1 to 40 weight percent or 1 to 30 weight percent polar monomer, this amount can include 1 to 15 weight percent acidic monomer with the remainder being a non-acidic polar monomer.

Other optional monomers can be included in the first polymerizable composition. The optional monomers typically do not include a macromer or a crosslinking agent. In many embodiments, the first polymerizable composition is free or substantially free of vinyl acetate and non-polar vinyl monomers. As used herein to describe vinyl acetate and non-polar vinyl monomers, the term "substantially free" means that the first polymerizable composition contain no greater than 1 weight percent, no greater than 0.5 weight percent, no greater than 0.2 weight percent, no greater than 0.1 weight percent, no greater than 0.05 weight percent, or no greater than 0.01 weight percent of these monomers based on the total weight of monomers.

In addition to the monomers (e.g., an alkyl (meth)acylate and an optional polar monomer), the first polymerizable composition typically includes a free-radical initiator. The initiator can be a thermal initiator or a photoinitiator. Multiple thermal initiators or photoinitiators can be used. The amount of the free radical initiator can influence the molecular weight of the first (meth)acrylate polymer, with larger amounts of the free radical initiator typically producing lower molecular weight polymers. The amount of the initiator is often in a range of 0.01 to 5 weight percent based on the total weight of polymerizable components in first polymerizable composition. The amount can be at least 0.01 weight percent, at least 0.05 weight percent, at least 0.1 weight percent, at least 0.2 weight percent, at least 0.5 weight percent, or at least 1 weight percent and up to 5 weight percent, up to 4 weight percent, up to 3 weight percent, up to 2 weight percent, up to 1 weight percent, or up to 0.5 weight percent.

Exemplary thermal initiators include various azo compound such as those commercially available under the trade designation VAZO from Chemours Co. (Wilmington, DE, USA) including VAZO 67, which is 2,2'-azobis(2-methylbutane nitrile), VAZO 64, which is 2,2'-azobis(isobutyronitrile), VAZO 52, which is (2,2'-azobis(2,4-dimethylpentanenitrile), and VAZO 88, which is 1,1'-azobis(cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemical, Inc. (Philadelphia, PA, USA) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)-3-hexyne); various hydroperoxides such as tert-amyl hydroperoxide and tert-butyl hydroperoxide; and mixtures thereof.

In many embodiments, a photoinitiator is used to form the first (meth)acrylate polymer. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, NJ, USA) or under the trade designation ESACURE KB-1 from Sartomer (Exton, PA, USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxycyclohexyl phenyl ketone (commercially available under the trade designation IRGACURE 184), bis(2,4,6-trimethylbenzoyl)phenyl phosphine oxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio)phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, NY, USA)).

Chain-transfer agents optionally can be included in the first polymerizable composition to control the molecular weight of the first (meth)acrylate polymer. Suitable chain-transfer agents include, but are not limited to, those selected from the group of carbon tetrabromide, hexabromoethane, bromotrichloromethane, 2-mercaptoethanol, tert-dodecylmercaptan, isooctylthioglycoate, 3-mercapto-1,2-propanediol, cumene, pentaerythritol tetrakis(3-mercapto butyrate) (available under the trade name KARENZ MT PEI from Showa Denko), ethylene glycol bisthioglycolate, and mixtures thereof. Depending on the reactivity of the chain-transfer agent selected, the amount of chain transfer agent is often in a range of 0 to 5 weight percent based on the total weight of monomers in the first polymerizable composition.

In some embodiments, the amount of the chain transfer agent is at least 0.05 weight percent, at least 0.1 weight percent, at least 0.2 weight percent, at least 0.3 weight percent, or at least 0.5 weight percent and can be up to 5 weight percent, up to 4.5 weight percent, up to 4 weight percent, up to 3.5 weight percent, up to 3 weight percent, up to 2.5 weight percent, up to 2 weight percent, up to 1.5 weight percent, or up to 1 weight percent. The weight percent values are based on the total weight of the polymerizable components in the first polymerizable composition to form the first (meth)acrylate polymer.

Polymerization of the first polymerizable composition to form the first (meth)acrylate polymer can occur in the presence or absence of an optional non-reactive organic solvent. If a non-reactive organic solvent is included in the first polymerizable composition, the amount is often selected to provide the desired viscosity. Examples of suitable non-reactive organic solvents include, but are not limited to, methanol, tetrahydrofuran, ethanol, isopropanol, pentane, hexane, heptane, acetone, methyl ethyl ketone, methyl acetate, ethyl acetate, toluene, xylene, and ethylene glycol alkyl ether. Those organic solvents can be used alone or as mixtures thereof. If used, the amount of the non-reactive organic solvent is often no greater than 10 weight percent, no greater than 5 weight percent, no greater than 4 weight percent, no greater than 3 weight percent, no greater than 2 weight percent, or no greater than 1 weight percent based on a total weight of the first polymerizable composition. In some embodiments, no non-reactive organic solvent is purposely added but may be a component (e.g., contaminant or diluent) of another constituent of the first polymerizable composition. In many embodiments, the first polymerizable composition is free or substantially free of non-reactive organic solvents. As used herein with reference to the non-reactive organic solvent, "substantially free" means that the first polymerizable composition contains less than 1 weight percent, less than 0.5 weight percent, less than 0.1 weight percent, less than 0.05 weight percent, or less than 0.01 weight percent non-reactive organic solvent.

The first polymerizable composition is typically partially polymerized to form a syrup composition that contains a solute polymer dissolved in solute monomers. The polymerization process typically occurs by exposure of the first polymerizable composition to actinic radiation, which is often ultraviolet radiation, or to heat (e.g., 40 to 100 degrees Celsius). The solute polymer is the first (meth)acrylate polymer and the solute monomers are the unreacted monomers. The polymerization time is typically selected so that no greater than 20 weight percent of the monomers in the first polymerizable composition are polymerized. That is, the syrup composition usually contains 1 to 20 weight percent solute polymer (i.e., the first (meth)acrylate polymer) and 80 to 99 weight percent solvent monomers based on a total weight of the syrup composition. The amount of the solute polymer can be at least 1 weight percent, at least 2 weight percent, at least 3 weight percent, at least 5 weight percent, or at least 10 weight percent and up to 20 weight percent, up to 15 weight percent, up to 10 weight percent, or up to 5 weight percent based on the total weight of monomers in the first polymerizable composition. The remainder of the syrup composition is typically predominately the solvent monomers (e.g., there can be small amounts of other components added to the first polymerizable composition such as the initiator and/or chain transfer agent and/or non-reactive organic solvent).

In some examples, the syrup composition contains 1 to 15 weight percent first (meth)acrylate polymer and 85 to 99 weight percent solvent monomers, 1 to 10 weight percent first (meth)acrylate polymer and 90 to 99 weight percent solvent monomers, 5 to 20 weight percent first (meth) acrylate polymer and 80 to 95 weight percent solvent monomers, or 5 to 15 weight percent first (meth)acrylate polymer and 85 to 95 weight percent solvent monomers. The solvent monomers include both the alkyl (meth)acrylate and the optional polar monomer. The amounts are based on the total weight of the syrup composition.

In some more specific examples, the syrup composition contains 1 to 20 weight percent first (meth)acrylate polymer, 0 to 40 weight percent polar monomers, and 40 to 99 weight percent alkyl (meth)acrylate monomers or 1 to 20 weight percent first (meth)acrylate polymer, 1 to 40 weight percent polar monomers, and 40 to 98 weight percent alkyl(meth) acrylate monomers. In some examples, the syrup compositions contain 1 to 20 weight percent first (meth)acrylate polymer, 1 to 30 weight percent polar monomers, and 50 to 98 weight percent alkyl (meth)acrylate monomers or 1 to 20 weight percent first (meth)acrylate polymer, 1 to 15 weight percent polar monomers, and 65 to 98 weight percent alkyl (meth)acrylate monomers. In other examples, the syrup composition contains 5 to 20 weight percent first (meth) acrylate polymer, 1 to 25 weight percent polar monomers, and 55 to 94 weight percent alkyl (meth)acrylates or 5 to 20 weight percent first (meth)acrylate polymer, 1 to 15 weight percent polar monomers, and 65 to 94 weight percent alkyl (meth)acrylates. In still other examples, the syrup composition contains 1 to 15 weight percent first (meth)acrylate polymer, 1 to 30 weight percent polar monomers, and 45 to 98 weight percent alkyl (meth)acrylate or 1 to 15 weight percent first (meth)acrylate polymer, 1 to 15 weight percent polar monomers, and 60 to 98 weight percent alkyl (meth) acrylate. In yet another example, the syrup composition contains 1 to 10 weight percent first (meth)acrylate polymer, 1 to 30 weight percent polar monomers, and 60 to 98 weight percent alkyl (meth)acrylate or 1 to 10 weight percent first (meth)acrylate polymer, 1 to 15 weight percent polar monomers, and 45 to 98 weight percent alkyl (meth)acrylate.

The first (meth)acrylate polymer (i.e., solute polymer) typically has a weight average molecular weight of at least 300,000 Daltons. For example, the weight average molecular weight can be at least 350,000 Daltons, at least 400,000 Daltons, at least 500,000 Daltons, or at least 600,000 Daltons and up to 1,000,000 Daltons or even higher. The weight average molecular weight can be determined using gel permeation chromatography with polystyrene standards.

Second Polymerizable Composition

The second (meth)acrylate polymer is formed from a second polymerizable composition that includes (a) an alkyl (meth)acrylate, (b) a polar monomer, (c) a PTHF (meth) acrylate macromer, and (d) a crosslinking monomer having a plurality of (meth)acryloyl groups. The second (meth) acrylate polymer can be formed in the presence or absence of the first (meth)acrylate polymer.

In some embodiments, the second (meth)acrylate polymer can be formed in the presence of the first (meth)acrylate polymer. That is, the second polymerizable composition can further include the first (meth)acrylate polymer. If the first (meth)acrylate is present, it is typically part of a syrup composition formed from the first polymerizable composition. Alternatively, in other embodiments, the second polymerizable composition can be prepared that does not include either a syrup composition or the first (meth)acrylate polymer.

Typically, the second polymerizable composition contains (a) a syrup composition formed from a first polymerizable composition comprising (i) an alkyl (meth)acrylate and (ii) an optional polar monomer, (b) a polar monomer if the syrup composition is free of the optional polar monomer, (c) a PTHF (meth)acrylate macromer, and (d) a crosslinking monomer having a plurality of (meth)acryloyl groups. The syrup composition contains (a) 1 to 20 weight percent solute polymer having a weight average molecular weight of at least 300,000 Daltons and that is the first (meth)acrylate polymer and (b) 80 to 99 weight percent solvent monomers. The polymerized product of the second polymerizable composition contains the first (meth)acrylate polymer plus a second (meth)acrylate polymer that is crosslinked. Because the first (meth)acrylate polymer is not a living polymer, it does not polymerize further during the polymerization of the second polymerizable composition to form the second (meth)acrylate polymer. Thus, the polymerized product of the second polymerizable composition is a polymeric blend of the first and second (meth)acrylate polymers.

The alkyl (meth)acrylate monomers that can be used for preparation of the second (meth)acrylate polymer can be the same as those described for use in the preparation of the first (meth)acrylate polymer. In some embodiments, at least some of the alkyl (meth)acrylate monomers included in the second polymerizable composition are the unreacted solvent monomers in the syrup composition formed by partial polymerization of the first polymerizable composition. Additional amounts of the alkyl (meth)acrylate monomers used to form the first (meth)acrylate polymer or other types of these monomers can be added to the second polymerizable composition, if desired.

The second polymerizable composition typically include 25 to 95 weight percent alkyl (meth)acrylate monomers based on a total weight of polymerizable components in the second polymerizable composition. The amount of the alkyl (meth)acrylate can be at least 25 weight percent, at least 30 weight percent, at least 35 weight percent, at least 40 weight percent, at least 45 weight percent, at least 50 weight percent, at least 55 weight percent, at least 60 weight percent, at least 65 weight percent, or at least 70 weight percent and up to 95 weight percent, up to 90 weight percent, up to 85 weight percent, up to 80 weight percent, up to 75 weight percent, up to 70 weight percent, up to 65 weight percent, or up to 60 weight percent. The amount is based on the total weight of polymerizable components in the second polymerizable composition.

The polar monomers that can be used for the preparation of the second (meth)acrylate polymer can be the same as those described as optional polar monomers for use in the preparation of the first (meth)acrylate polymer. In some embodiments, at least some of the polar monomers included in the second polymerizable composition are the unreacted polar monomers in the syrup composition formed by partial polymerization of the first polymerizable composition. That is, the first polymerizable composition contained polar monomers. If polar monomers were included in the first polymerizable composition, additional polar monomers can be added to the second polymerizable monomer, if desired. These additional polar monomers can be the same or different than those included in the first polymerizable composition. If polar monomers were not included in the first polymerizable composition, they are included in the second polymerizable composition.

The second polymerizable composition typically includes 0.5 to 40 weight percent polar monomer based on a total weight of polymerizable components in the second polymerizable composition. The amount of the polar monomer can be at least 0.5 weight percent, at least 1 weight percent, at least 2 weight percent, at least 3 weight percent, at least 5 weight percent, or at least 10 weight percent and up to 40 weight percent, up to 35 weight percent, up to 30 weight percent, up to 25 weight percent, up to 20 weight percent, up to 15 weight percent, up to 10 weight percent, or up to 5 weight percent. The polar monomer can be an acidic monomer, a non-acidic monomer, or a combination thereof. As in the first polymerizable composition, the amount of a polar monomer having an acidic group is usually no greater than 15 weight percent based on the total weight of polymerizable components in the second polymerizable composition.

In addition to the alkyl (meth)acrylate and the polar monomer, the second polymerizable composition includes a (meth)acrylate macromer having a poly(tetrahydrofuran) group, which is referred to as a PTHF (meth)acrylate macromer. This macromer can be prepared, for example, by polymerizing tetrahydrofuran using cationic polymerization. More specifically, the polymerization reaction can occur at room temperature (e.g., 20 to 25 degrees Celsius) using trifluoromethanesulfonate as the initiator to form an intermediate (A) where n is equal to the number of $-CH_2CH_2CH_2CH_2O-$ groups. Intermediate (A) is then reacted with hydroxybutyl acrylate in the presence of N,N-diisoproylethylamine (DIPEA) to form the PTHF (meth)acrylate macromer. This method is shown in Reaction Scheme A.

Reaction Scheme A

The weight average molecular weight of the PTHF (meth) acrylate macromer is typically in a range of 500 to 12,000 Daltons, which can be determined using known methods such as gel permeation chromatography with polystyrene standards. If the molecular weight is higher, it may not be miscible with the other components such as the syrup composition in the second polymerizable composition and/ or crystallize before, during, or after polymerization of the second (meth)acrylate polymer. Additionally, the PTHF (meth)acrylate macromer is often selected so that the PTHF sidechains do not undergo microphase separation from the remainder of the second (meth)acrylate polymer. In many embodiments, the PTHF (meth)acrylate macromer has a weight average molecular weight of at least 500 Daltons, at least 600 Daltons, at least 800 Daltons, at least 1,000 Daltons, at least 2,000 Daltons, or at least 3,000 Daltons and up to 12,000 Daltons, up to 10,000 Daltons, up to 8,000 Daltons, up to 6,000 Daltons, up to 5,000 Daltons, or up to 3,000 Daltons.

The PTHF (meth)acrylate macromer often has a glass transition temperature (as measured using a homopolymer of the macromer) that is no greater than –20° C. For example, the glass transition temperature can be no greater than –30° C., no greater than –40° C., no greater than –50° C., or no greater than –60° C. Such a low macromer glass transition temperature imparts compliance and flexibility to the adhesive composition containing the first and second (meth) acrylate polymers.

The PTHF (meth)acrylate macromer is typically not contaminated with a PTHF di(meth)acylate macromer. Typically, the amount of PTHF di(meth)acrylate macromer is present in an amount from 0 to 0.5 weight percent based on the total weight of the macromer components. The amount is often less than 0.4 weight percent, less than 0.3 weight percent, less than 0.2 weight percent, less than 0.1 weight percent, less than 0.05 weight percent, or less than 0.01 weight percent.

The second polymerizable composition typically include 2 to 50 weight percent PTHF (meth)acrylate macromer based on a total weight of polymerizable components in the second polymerizable composition. The amount can be at least 2 weight percent, at least 3 weight percent, at least 5 weight percent, at least 10 weight percent, at least 15 weight percent, or at least 20 weight percent and up to 50 weight percent, up to 45 weight percent, up to 40 weight percent, up to 35 weight percent, up to 30 weight percent, up to 25 weight percent, up to 20 weight percent, up to 15 weight percent, or up to 10 weight percent. The amount is based on the total weight of polymerizable components in the second polymerizable composition.

The second polymerizable composition further includes a crosslinking monomer. That is, the second (meth)acrylate polymer is crosslinked. The crosslinking monomer has a plurality of (meth)acryloyl groups. The number of (meth) acryloyl groups is typically 2, 3, or 4. Typically, such crosslinking improves durability and cohesion properties of the adhesive composition. Examples of multifunctional (meth)acrylate monomer crosslinking agents include, but are not limited to, 1,3-butylene glycol diacrylate, 1,4-butanediol diacrylate, poly(ethylene glycol) diacrylate (e.g., those having a Mw in a range of 100 to 1,000 Daltons), ethoxylated bisphenol A diacrylate, tetraethylene glycol diacrylate, trimethyloyl propane triacrylate, and 1,6-hexanediol diacrylate.

The polymerizable components of the second polymerizable composition often contain 0.01 to 5 weight percent of the crosslinking monomer. The amount can be at least 0.01 weight percent, at least 0.05 weight percent, at least 0.1 weight percent, at least 0.2 weight percent, at least 0.3 weight percent, at least 0.5 weight percent, or at least 1 weight percent and up to 5 weight percent, up to 4 weight percent, up to 3 weight percent, up to 2 weight percent, or up to 1 weight percent based on the total weight of polymerizable components in the second polymerizable composition. The amount of the crosslinking monomer included depends on well-understood factors such as the desired degree of crosslinking and/or the relative effectiveness of the crosslinking monomer in the specific system, as measured by well-known tests such as shear adhesion.

The second polymerizable composition is usually free of a multivalent salt that can function as a crosslinking agent. Using a crosslinking monomer that can form covalent bonds (rather than ionic bonds) with the second (meth)acrylate polymer tends to result in the formation of adhesive compositions with improved shear strength, especially at elevated temperatures.

Other components can be added to the second reaction polymerizable composition such as any of the initiators, chain transfer agents, and non-reactive organic solvents described above for use in the first polymerizable composition. The amount of these components is comparable to that described for use in the first polymerizable composition.

Considering only the polymerizable components, which excludes the first (meth)acrylate polymer either because it does not undergo further polymerization or because it is absent, the second polymerizable composition typically contains 0.5 to 40 weight percent polar monomers, 25 to 95 weight percent alkyl (meth)acrylate monomers, 2 to 50 weight percent PTHF (meth)acrylate macromer, and 0.01 to 5 weight percent crosslinking monomer based on the total weight of polymerizable components in the second polymerizable composition. For example, the second polymerizable composition can contain 1 to 30 weight percent polar monomers, 30 to 95 weight percent alkyl (meth)acrylate monomers, 4 to 40 weight percent PTHF (meth)acrylate macromer, and 0.01 to 5 (or 0.01 to 1) weight percent crosslinking monomer. In another example, the second polymerizable composition can contain 1 to 20 weight percent polar monomers, 40 to 90 weight percent alkyl (meth)acrylate monomers, 4 to 40 weight percent PTHF (meth)acrylate macromer, and 0.01 to 5 (or 0.01 to 1) weight percent crosslinking monomer. In yet another example, the second polymerizable composition can contain 1 to 15 weight percent polar monomers, 50 to 90 weight percent alkyl (meth)acrylate monomers, 5 to 30 weight percent PTHF (meth)acrylate macromer, and 0.01 to 5 (or 0.01 to 1) weight percent crosslinking monomer. The amounts are based on the total weight of polymerizable components in the second polymerizable composition.

If the second polymerizable composition includes a syrup composition containing the first (meth)acrylate polymer as the solute polymer and unreacted syrup monomers, the second polymerizable composition usually contains 50 to 98 weight percent syrup composition, 2 to 50 weight percent PTHF (meth)acrylate macromer, and 0.01 to 5 weight percent crosslinking monomer. If the syrup composition is free of polar solvent, 0.5 to 40 weight percent polar monomers is added. Considering the content of the syrup composition, the second polymerizable composition typically contains 0.5 to 20 weight percent first (meth)acrylate polymer (i.e., the solute polymer in the syrup composition), 0.5 to 40 weight percent polar monomers, 25 to 95 weight percent alkyl (meth)acrylate monomers, 2 to 50 weight percent PTHF (meth)acrylate macromer, and 0.01 to 5 weight percent crosslinking monomer. The amounts are based on the total weight of the second polymerizable composition.

In some examples, the second polymerizable composition contains 1 to 20 weight percent first (meth)acrylate polymer (i.e., the solute polymer in the syrup composition), 1 to 40 weight percent polar monomers, 25 to 95 weight percent alkyl (meth)acrylate monomers, 4 to 40 weight percent PTHF (meth)acrylate macromer, and 0.01 to 5 (or 0.01 to 1)

weight percent crosslinking monomer. In still other examples, the second polymerizable composition contains 5 to 20 weight percent first (meth)acrylate polymer (i.e., the solute polymer in the syrup composition), 1 to 30 weight percent polar monomers, 40 to 90 weight percent alkyl (meth)acrylate monomers, 4 to 40 weight percent PTHF (meth)acrylate macromer, and 0.01 to 5 (or 0.01 to 1) weight percent crosslinking monomer. In yet further examples, the second polymerizable composition contains 5 to 15 weight percent first (meth)acrylate polymer (i.e., the solute polymer in the syrup composition), 1 to 20 weight percent polar monomers, 50 to 90 weight percent alkyl (meth)acrylate monomers, 5 to 30 weight percent PTHF (meth)acrylate macromer, and 0.01 to 5 (or 0.01 to 1) weight percent crosslinking monomer. The amounts are based on the total weight of the second polymerizable composition.

Like the first polymerizable composition, the second polymerizable composition can be polymerized by exposure of the second polymerizable composition to actinic radiation, which is often ultraviolet radiation, or to heat (e.g., 40 to 100 degrees Celsius).

Adhesive Composition and Method of Making

An adhesive composition is provided that includes both a first (meth)acrylate polymer plus a second (meth)acrylate polymer that is crosslinked. The adhesive composition contains 0.5 to 20 weight percent of the first (meth)acrylate polymer and 80 to 99.5 weight percent of the second (meth)acrylate polymer based on a total weight of polymeric material in the adhesive composition. The first (meth)acrylate polymer has a weight average molecular weight of at least 300,000 Daltons and is a polymerized product of a first polymerizable composition comprising (a) an alkyl (meth) acrylate and (b) an optional polar monomer. The second (meth)acrylate polymer is a polymerized product of a second polymerizable composition comprising (a) an alkyl (meth) acrylate, (b) a polar monomer, (c) a poly(tetrahydrofuran) (meth)acrylate macromer, and (d) a crosslinking monomer having a plurality of (meth)acryloyl groups. The second (meth)acrylate polymer is crosslinked but the first (meth) acrylate polymer is not crosslinked.

Any method of making the adhesive composition can be used. In many embodiments, the method includes polymerizing the second (meth)acrylate polymer in the presence of the first (meth)acrylate polymer. More specifically, the method includes providing a first polymerizable composition that comprises (a) an alkyl (meth)acrylate and (b) an optional polar monomer. The method further includes forming a syrup composition by partially polymerizing the first polymerizable composition. The syrup composition contains (a) 1 to 20 weight percent solute polymer and (b) 80 to 99 weight percent solvent monomers based on a total weight of the syrup composition. The solute polymer has a weight average molecular weight of at least 300,000 Daltons and is a first (meth)acrylate polymer. The method yet further includes preparing a second polymerizable composition comprising (a) the syrup composition, (b) a polar monomer if the syrup composition is free of the optional polar monomer, (c) a poly(tetrahydrofuran) (meth)acrylate macromer, and (d) a crosslinking monomer having a plurality of (meth) acryloyl groups. The method still further includes polymerizing the second polymerizable composition to form an adhesive composition comprising the first (meth)acrylate polymer plus a second (meth)acrylate polymer that is crosslinked. The adhesive composition is typically a pressure-sensitive adhesive.

In some embodiments, the second polymerizable composition is coated on a substrate and then cured on the substrate. The substrate can be in the form of a moving web that is passed through an oven (e.g., 40 to 100 degrees Celsius) or under ultraviolet radiation for polymerization (i.e., curing) of the second polymerizable composition.

The adhesive composition typically contains 0.5 to 20 weight percent of the first polymer and 80 to 99.5 weight percent of the second polymer based on a total weight of polymeric material in the adhesive composition. For example, the adhesive composition can include 1 to 20 weight percent first polymer and 80 to 99 weight percent second polymer, 2 to 20 weight percent first polymer and 80 to 98 weight percent second polymer, 5 to 20 weight percent first polymer and 80 to 95 weight percent second polymer, or 5 to 15 weight percent first polymer and 85 to 95 weight percent second polymer based on the total weight of polymeric material in the adhesive composition.

The adhesive composition includes at least the first and second (meth)acrylate polymers. The combination of the two (meth)acrylate polymers may have adhesive properties suitable for performing as a pressure-sensitive adhesive. Alternatively, optional additives such as a tackifier and/or plasticizer may be combined with the (meth)acrylate polymers to provide a composition with suitable adhesive properties. Useful tackifiers include, for example, rosin ester resins, terpene phenol resins, and hydrogenated C5-C9 hydrocarbon resins. The amount of the optional tackifier is often in a range of 0 to 25 weight percent, 0 to 20 weight percent, 0 to 15 weight percent, 0 to 10 weight percent, or 0 to 5 weight percent based on the total weight of the first and second (meth)acrylate polymers (or their polymerizable components).

Optional antioxidants and/or stabilizers such as those available under the trade designation IRGANOX 1010 (pentaerythritol tetrakis(3-(3,5-di-tert-butyl-4-hydroxyphenyl) propionate)) from BASF Corp. (Florham Park, NJ, USA) can be added to increase the temperature stability of the (meth)acrylate polymers. If used, the antioxidant and/or stabilizer is typically added in a range of 0.01 weight percent to 1.0 weight percent on the total weight of the first and second (meth)acrylate polymers (or their polymerizable components).

Various other optional components can be added to the adhesive composition such as, for example, adhesion promoters (e.g., (3-glycidyloxypropyl)trimethoxysilane or (3-glycidyloxypropyl)triethoxysilane), colorants (e.g., titania or carbon black), dyes, corrosion inhibiters (e.g., benzotriazole), antistatic agents, plasticizers, thickeners, thixotropic agents, processing aides, nanoparticles, fibers, fillers, and combinations thereof. Generally, the amounts of each additive would depend on the use of the adhesive composition.

The adhesive composition typically has a glass transition temperature no greater than 25° C. or 20° C. as determined by Dynamic Mechanical Analysis. For example, the glass transition temperature can be no greater than –20° C., no greater than –25° C., no greater than –30° C., no greater than –35° C., or no greater than –40° C. The glass transition temperature is often greater than –50° C., greater than –40° C., or greater than –30° C. In some embodiments, the glass transition temperature is in a range of –30° C. to 0° C. The glass transition temperature can be measured using Dynamic Mechanical Analysis. The DMA scan often contains a single peak.

The adhesive composition typically has a tensile impact strength of 0.4 Joules using the test procedure described in the Example section. The tensile impact strength is often at least 0.45 Joules, at least 0.50 Joules, at least 0.55 Joules, at least 0.60 Joules, or at least 0.65 Joules.

The adhesive composition typically has a peel strength on stainless steel of at least 0.70 N/mm when measured at 23° C. after one day. This peel strength is often at least 0.75 N/mm, at least 0.8 N/mm, at least 0.85 N/mm, or at least 0.90 N/mm. After storage of the adhesive compositions for three days at 65° C. and 90 percent relative humidity, the peel strength is at least 50 percent of that measured after 1 day at 23° C. The amount can be at least 55 percent, at least 60 percent, at least 65 percent, or at least 70 percent. The peel strength is measured as described in the Example section.

The adhesive composition has a shear strength, when measured according to the method described in the Example section, that is greater than 10,000 minutes.

Articles

Articles are provided that include the adhesive composition and a substrate. Any suitable substrate can be used. In many embodiments, a layer of the adhesive composition is positioned adjacent to the substrate. The adhesive composition may directly contact the substrate or may be separated from the substrate by one of more layers such as a primer layer.

Any suitable substrate can be used. In some articles, the substrate is flexible. Examples of flexible substrate materials include, but are not limited to, polymeric films, woven or nonwoven fabrics; metal foils, foams (e.g., polyacrylic, polyethylene, polyurethane), and combinations thereof (e.g., metalized polymeric film). Polymeric films include, for example, polypropylene (e.g., biaxially oriented), polyethylene (e.g., high density or low density), polyvinyl chloride, polyurethane (e.g., thermoplastic polyurethanes), polyester (e.g., polyethylene terephthalate (PET), polyethylene naphthalate (PEN), and polylactic acid copolymer), polycarbonate, polyacrylate, polymethyl(meth)acrylate (PMMA), polyvinylbutyral, polyimide, polyamide, fluoropolymer, cellulose acetate, triacetyl cellulose (TAC), ethyl cellulose, and polycyclic olefin polymers (COP). The woven or nonwoven fabric may include fibers or filaments of synthetic or natural materials, such as cellulose, cotton, nylon, rayon, glass, ceramic materials, and the like.

In some embodiments, the article is or contains an adhesive tape. Examples of such adhesive tapes include transfer tapes, one-sided adhesive tapes, two-sided tapes (i.e., a core substrate with an adhesive layer on each side of the substrate, or die-cut adhesive articles (e.g. the article has an adhesive layer positioned adjacent to one release liner or positioned between two release liners). Such adhesive tapes may include a wide variety of substrates for use as a backing or release liner. Examples include woven and nonwoven materials, plastic films, metal foils, and the like.

Adhesive tapes are often prepared by coating the second polymerizable composition upon a variety of flexible or inflexible backing materials and/or release liners using conventional coating techniques to produce a one-sided tape or a two-sided tape. The second polymerizable composition is often cured while on backing material and/or release liner to form the adhesive composition. In the case of a one-sided adhesive tape, the second polymerizable composition can be coated on a layer of backing material and the side of the backing material opposite that where the adhesive is disposed can be coated with a suitable release material (e.g., a release layer or release liner). Release materials are known and include materials such as, for example, silicone, polyethylene, polycarbamate, polyacrylics, and the like. For two-sided adhesive tape, a first adhesive composition layer is on a first major surface of a backing material and a second layer of adhesive composition is on the opposing major surface of the backing material. The second layer may include the adhesive compositions as described herein or a different adhesive composition. For a die-cut adhesive article or for a transfer tape, the adhesive composition is typically positioned between two release liners.

The adhesive articles can be part of another article. For example, the adhesive composition can bind two parts of an article together. In some such articles, the adhesive is positioned adjacent to a substrate that is flexible and/or foldable and is used within another article that is flexible and/or foldable such as within an electronic device that is flexible and/or foldable.

In some embodiments, the article containing the adhesive composition is part of an electronic device. In such devices, the adhesive composition typically forms a layer between two substrates for binding of the two substrates together. Examples of suitable substrates include materials such as polyacrylate, polymethyl methacrylate, polycarbonate, polyamide, polyimide, polyethylene terephthalate (PET), polyethylene naphthalate (PEN), polycyclic olefin polymers (COP), thermoplastic polyurethane, triacetyl cellulose (TAC), and metal foil.

A common application of adhesives in the electronics industry is in the manufacturing of various displays, such as computer monitors, TVs, cell phones, small displays (in cars, appliances, wearables, electronic equipment, etc.). Flexible electronic displays, where the display can be bent freely without cracking or breaking, is a rapidly emerging technology area for making electronic devices using, for example, flexible plastic substrates. This technology allows integration of electronic functionality into non-planar objects, conformity to desired design, and flexibility during use that can give rise to a multitude of new applications. Thus, in some embodiments, the electronic device includes a flexible display.

With the emergence of flexible electronic displays, there is an increasing demand for adhesives, and particularly for optically clear adhesives (OCA), to serve as an assembly layer or gap filling layer between an outer cover lens or sheet (based on glass, polyethylene terephthalate (PET), polycarbonate (PC), polymethyl methacrylate (PMMA), polyimide, polyethylene naphthalate (PEN), cyclic olefin copolymer, etc.) and an underlying display module of electronic display assemblies. The presence of the OCA improves the performance of the display by increasing brightness and contrast, while also providing structural support to the assembly. In a flexible assembly, the OCA will also serve as the assembly layer, which in addition to the typical OCA functions, may also absorb most of the folding induced stress to prevent damage to the fragile components of the display panel and protect the electronic components from breaking under the stress of folding. The OCA layer may also be used to position and retain the neutral bending axis at or at least near the fragile components of the display, such as for example the barrier layers, the driving electrodes, or the thin film transistors of an organic light emitting display (OLED). The adhesive compositions described herein can be prepared to be an OCA.

In some embodiments, the electronic device includes a photovoltaic device. Photovoltaic devices are rapidly advancing in performance and device construction. The ability to roll or fold portable arrays is an attractive design for off grid uses such as remote area travel or living, camping, and mobile applications. As the photovoltaic (PV) components become more efficient, the number of modules needed to produce enough power decreases, reducing both size and weight. Integrating organic PV cells or inorganic PV cells onto or into a flexible format offer advantageous designs.

Other flexible articles that can include the adhesive composition described herein include, for example, rollable keyboards, electronic games, sensors, light-emitting elements, and articles of clothing.

The article is often formed by positioning an adhesive layer adjacent to a substrate. The adhesive composition is often formed from the second polymerizable composition that is coated on a substrate (e.g., a backing or a release liner) using conventional coating techniques and then cured. For example, the second polymerizable composition can be applied by methods such as roller coating, flow coating, dip coating, spin coating, spray coating, and die coating. The adhesive composition that is coated may have any desirable weight percent solids but is often in a range of 10 to 100 weight percent solids based on the total weight of the adhesive composition. The desired solids content may be achieved by further dilution of the coating composition, or by partial drying. The second polymerizable composition is usually cured by actinic radiation (e.g., radiation in the UV and/or visible region of the electromagnetic spectrum) or by application of heat.

The adhesive composition positioned on a substrate as a layer or positioned between two release liners as a layer often has a thickness up to 100 micrometers (i.e., microns or m), up to 50 micrometers, up to 35 micrometers, or up to 25 micrometers. In some embodiments, the adhesive composition may have an overall (average) thickness of the adhesive composition disposed on a substrate in a layer (e.g., in the form of a coating placed between liners) of up to 400 micrometers, up to 300 micrometers, or up to 200 micrometers. The thickness that is desirable is dependent on the specific use of the adhesive layer.

EXAMPLES

Unless otherwise noted or readily apparent from the context, all parts, percentages, ratios, etc. in the Examples and the rest of the specification are by weight.

TABLE 1

| Materials Used in the Examples | |
| --- | --- |
| Abbreviation | Description and Source |
| 2-EHA | 2-Ethylhexyl acrylate, obtained from BASF, Ludwigshafen, Germany |
| 2-MBA | 2-Methylbutyl acrylate, obtained from 3M Company, St. Paul, MN USA |
| IBOA | Isobornyl acrylate, obtained from San Esters, Osaka, Japan |
| AA | Acrylic acid, obtained from BASF, Ludwigshafen, Germany |
| NNDMA | N,N-dimethylacrylamide, obtained from TCI America, Portland, OR, USA |

TABLE 1-continued

Materials Used in the Examples

| Abbreviation | Description and Source |
|---|---|
| HDDA | 1,6-hexanediol diacrylate, obtained from Arkema, Paris, France |
| Irg651 | IRGACURE 651, obtained from Ciba Specialty Chemicals, Basel, Switzerland |
| PEG-A | Poly(ethylene glycol)-methyl ether acrylate, Mn = 480 Da obtained from Millipore Sigma, Burlington, MA, USA |
| HBA | 4-Hydroxybutyl acrylate, obtained from BASF, Ludwigshafen, Germany |
| HEA | 2-Hydroxyethyl acrylate, obtained from BASF, Ludwigshafen, Germany |
| | 2,6-Di-tertbutylpyridine, obtained from Millipore Sigma, Burlington, MA, USA |
| DIPEA | N,N-diisoproylethylamine, obtained from Millipore Sigma, Burlington, MA, USA |
| | Trifluoromethanesulfonic anhydride, obtained from Millipore Sigma, Burlington, MA, USA |
| | Methyl trifluoromethanesulfonate, obtained from Oakwood Products Inc., Estill, SC, USA |
| THF | Tetrahydrofuran, obtained from Fisher Scientific International Inc., Hampton, NH, USA |
| MeOH | Methanol, obtained from Fisher Scientific International Inc., Hampton, NH, USA |
| DCM | Dichloromethane, obtained from Fisher Scientific International Inc., Hampton, NH, USA |
| | Activated Basic alumina (basic Brockmann 1), obtained from Millipore Sigma, Burlington, MA, USA |
| | Potassium Hydroxide, obtained from Millipore Sigma, Burlington, MA, USA |
| Al(acac)$_3$ | Aluminum acetylacetonate, obtained from Millipore Sigma, Burlington, MA, USA |

Test Methods

Dynamic Mechanical Analysis (DMA) Testing

Transfer tapes for DMA testing were laminated together by hand to form a stack of 1-2 mm total thickness by removing the RF02N release liner and folding the tacky side onto itself repeatedly (using a 15-cm rubberized hand roller, Polymag Tek, NY, USA) to ensure no air bubbles were trapped within the adhesive. Dynamic mechanical analysis was used to probe the shear storage (G') and loss (G") moduli as a function of temperature, and to determine the glass transition temperature (T$_g$) of the material. An 8 mm diameter by 1-2 mm thick disk of the adhesive without liners was placed between the 8 mm probes of a DHR-3 or ARES-G2 parallel plate shear rheometer (TA Instruments, New Castle, Del., USA). A temperature scan was performed by ramping from +40° C. to –30° C. and then from –30° C. to 120° C. at 3° C./min heating rate, at a frequency of 1 Hz, and at a strain of less than or equal to 5%. The shear storage modulus and tan(δ) was recorded at select temperatures (e.g. 25° C., 70° C., and 85° C.). The Tg of the material was determined as the peak in tan δ vs. temperature (i.e., max tan(δ) and these results are reported in Table 4).

180° Peel Adhesion Testing

Peel adhesion was measured for PSA transfer tapes (adhesive transfer tape, ATTs) at an angle of 180 degrees. For peel adhesion testing to rigid substrates such as annealed 18 gauge, 304 stainless steel (SS), polycarbonate (PC), (both from Chem. Instruments, Fairfield, OH, USA), and glass (made from float Glass using the air side, from 3M Glass Laboratory), the adhesive tapes on backings were laminated directly to the 2-inch×6-inch (5.08 cm×15.24 cm) rigid substrate. This method followed ASTM D3330, test method E, liner side, and TM-613 (180 degree peel adhesion to stainless steel or backing) procedure F. To make the adhesive tapes with backings, PSA ATTs were laminated to the plasma-treated side of 2 mil (50 μm) biaxially oriented polyethylene terephthalate (PET) film (3M, treatment conditions are described in U.S. Pat. No. 10,134,566) for use as a backing material. All samples and substrates were conditioned in a controlled temperature and humidity (CTH) room of 23° C. and 50% RH for a period of time no less than 24 hours prior to testing. Test panels were cleaned with methyl ethyl ketone (MEK) solvent before and after testing. A rubberized 4.5-lb (2.04 Kg) roller was used to laminate the PET adhesive tapes to the panels (4×3 seconds roll downs). Peel testing was done using an Instron Universal Testing Instrument in a CTH room equipped with an environmental chamber. Peel tests were conducted at a rate of 12 inches/min (0.3 m/min) cross-head speed at a temperature of 23° C., before or after ageing at 65° C./90% RH for extended time. Each sample was peeled at least three times from the same SS substrate and averages of all three measurements are reported. All peel adhesion failure modes were adhesive unless otherwise stated, where "coh" is defined as cohesive split and "sho" is defined as shocky interfacial slippage.

Tensile Impact Testing

The tensile impact test is a destructive test to measure an adhesive material's tensile impact resistance in a dynamic event (e.g. drop). The PSA tapes between liners were cut to a predetermined geometry (see Table 2 for details) and laminated between two scratch free and freshly cleaned (MEK) stainless steel coupons of a specified geometry (see Table 2). The coupon-ATT stacks were dwelled for 48 hours at CTH conditions prior to being tested, and multiple replicates (>5) were made and tested. Data reported (i.e. total energy and peak force and force-displacement curves) are averages of at least 5 measurements. The coupon-adhesive stacks were tested using an Instron CEAST 9340 drop tower (0.3-450 J energy delivery) with a drop height of 115 mm, and a drop weight of 3 kilograms. The total energy absorbed and the peak force are reported for each adhesive tested in this configuration. This test represents a modified ISO 9653:1998 (test method for shear impact strength of adhesive bonds), but in a tensile mode, by utilizing the substrate geometry and assembly procedure outlined in Table 2.

TABLE 2

| Tensile Impact Test Parameters | | |
|---|---|---|
| Materials | Coupon Substrate | 304 stainless steel, mirror finish |
| | Housing Substrate | 304 stainless steel, mirror finish |
| Tape | Die-cut | Circle: 31.1 mm OD/26.1 mm |
| Geometry | | ID (2.0 mm width) |
| | | Outside Radius 4.0 mm |
| | | Inside Radius 2.0 mm |
| Assembly | Force | 42 N |
| Procedure | Time | 60 sec |
| Test | Bonding area | 225 mm² |
| Conditions | Dwell time | 48 h at 23° C. |
| | Drop height | 115 mm |
| | Total drop mass | 2.986 Kg |
| | Impact velocity | 1.50 m/s |
| | Impact energy | 3.37 J |
| | Temperature | 23 ± 1° C. |

Preparatory Examples

Synthesis of PTHF by Monomer Quench Route (Synthetic Route 1)

Synthesis of Poly(Tetrahydrofuran) Acrylate Macromer (PTHF-A) (1.2 kg/Mol Sample):

In a dry round-bottom flask with a septum, 1.5 ml methyl trifluoromethanesulfonate initiator was added to 517 grams dry THF under nitrogen. After 8.5 minutes, HBA and DIPEA were injected via syringe. The reaction was left stirring at room temperature quench solution stir for approximately 2 hours. The entire reaction solution was passed through a basic alumina column, which was then flushed with an equivalent volume of DCM. The DCM/THF mixture was removed by rotary evaporation and the polymer was dried under high vacuum for 8 hours. The dried polymer was stored in a refrigerator at 4° C. prior to use. Based on ¹H NMR end group analysis (using the acrylate groups vs. PTHF side chain) of the dried sample, the molar mass was estimated to be approximately 1.2 kg/mol.

Synthesis of PTHF-A (2.4 kg/Mol Sample):

To a dry solvent flask with a septum, 569 grams of THF and 1.7 ml methyl trifluoromethanesulfonate initiator were added under nitrogen. In a second flask, a quench solution was created by adding 20 ml HBA and 5.5 ml DIPEA under nitrogen. After 15 min reaction time, the HBA/DIPEA solution was injected into the THF polymerization flask to quench. After quenching for 2 hours, a crude ¹H NMR sample was removed for analysis. By ¹H-NMR the conversion was found to be about 7.7%. Based on this conversion, the calculated theoretical molar mass was found to be approximately 2.9 kg/mol. The majority of the residual THF was the removed by rotary evaporation, and the polymer then dissolved in DCM (approximately 400 ml), and passed through a plug of basic alumina (approximately 300 grams) to remove residual HBA, flushing with additional DCM (approximately 200 ml). The solvent was the removed by rotary evaporation and the polymer dried under high vacuum for 8 hours. After drying, the polymer was stored in a refrigerator at 4° C. prior to use.

Preparation of Adhesive Tapes

Examples 1-5 (EX 1 to EX 5) and Comparative Examples 1-2 (CE 1 to CE 2)

Monomers were combined in the appropriate wt-% ratios to target the desired final polymer composition, with a total wt-% of 100% by mass. Specifically, the monomer mixture was 2-EHA/2-MBA/IBOA/AA/NNDMA (41%/41%/6%/10%/2%). To this was added IRGACURE 651 at 0.02 per hundred rubber (phr, with respect to the total mass of 100 wt-% of the monomers). The monomer and initiator mixture were degassed with nitrogen for 10 min, and then exposed to low intensity (0.3 mW/cm²) UVA radiation from a 360 nm UV-LED light source while stirring until a viscosity of approximately 1000-2000 cP was obtained. IRGACURE 651 (0.2 phr), HDDA (0.10 phr) and macromonomer (5-20 phr, see Table 3) was then added to the polymer syrup, and the solution was well mixed. The solution was coated between PET release liners (Tight side: RF22N or RF12N and easy side: RF02N; available from SKC Haas, Seoul, Korea, 2 mil). The coated solutions were cured with 1,600 mJ/cm$^2$ of total UVA 365 nm UV-LED irradiation to produce tacky adhesive films. For adhesive performance testing, the RF02N liner was removed, and the exposed side of the tacky adhesive tape was rolled by hand lamination (using a 6-inch (15-cm) rubberized hand roller, Polymag Tek, NY, US) onto a 6-inch (15-cm) wide primed polyester film (3M, 2-mil (50-μm) biaxially oriented PET film with plasma treatment conditions described in U.S. Pat. No. 10,134,566) ensuring no air bubbles were trapped between the adhesive and the primed polyester film.

TABLE 3

Sample compositions made using base monomer syrup of 2-EHA/2-MBA/IBOA/AA/NNDMA (41/41/6/10/2 wt. %).

| Sample | Macromer Added Post Syrup | | |
|---|---|---|---|
| ID | Type | Mw (kDa) | phr | mmol |
| EX 1 | PTHF-A | 1.2 | 5 | 2.5 |
| EX 2 | PTHF-A | 1.2 | 10 | 5 |
| EX 3 | PTHF-A | 1.2 | 20 | 10 |
| EX 4 | PTHF-A | 2.4 | 10 | 2 |
| EX 5 | PTHF-A | 2.4 | 20 | 4 |
| CE 1 | none | N/A | 0 | 0 |
| CE 2 | PEG-A | 0.6 | 20 | 18 |

TABLE 4

Rheological properties of the sample compositions at different temperatures

| Sample | Rheology Temperature Ramp (1 Hz, 3° C./min, <5% ε) | | | |
|---|---|---|---|---|
| ID | Tg (° C.) | G' 25° C. (kPa) | G' 85° C. (kPa) | Tan(δ) @ 70° C. |
| EX 1 | −2.2 | 158 | 48 | 0.286 |
| EX 2 | −7.0 | 107 | 40 | 0.258 |
| EX 3 | −12.5 | 86 | 39 | 0.227 |
| EX 4 | −7.5 | 118 | 37 | 0.322 |
| EX 5 | −18.8 | 62 | 24 | 0.307 |

TABLE 4-continued

Rheological properties of the sample compositions at different temperatures

| Sample | Rheology Temperature Ramp (1 Hz, 3° C./min, <5% ε) | | | |
|---|---|---|---|---|
| ID | Tg (° C.) | G' 25° C. (kPa) | G' 85° C. (kPa) | Tan(δ) @ 70° C. |
| CE 1 | +3.0 | 218 | 52 | 0.309 |
| CE 2 | −21.2 | 79 | 26 | 0.356 |

Comparative Examples 3-6 (CE 3 to CE 6)

Comparative Examples 3-6 were prepared using the same procedure described above for Examples 1-6 and Comparative Examples 1-2. Comparative Examples 3 and 4 used a syrup that was 2-EHA/2-MBA/IBOA/AA/NNDMA (35/35/8/2/20 wt. %) while Comparative Examples 5 and 6 used a syrup that was 2-EHA/2-MBA/IBOA/AA/NNDMA (41/41/6/10/2 wt. %). For all Comparative Examples 3-6, HDDA was replaced with aluminum acetylacetonate (Al(acac)$_3$) with that amount used shown in Table 5. The macromer used in Comparative Examples 3 and 4 was PEG-A while the macromer used in Comparative Examples 5 and 6 was PTHF-A.

TABLE 5

Sample compositions made replacing HDDA with Al(acac)$_3$

| Sample | Macromer Added Post Syrup | | | Al(acac)$_3$ | |
|---|---|---|---|---|---|
| ID | Type | Mw (kDa) | phr | Added Post Syrup (phr) | Observations |
| CE 3 | PEG-A | 0.6 | 10 | 0.5 | Coats well, but poor 70° C. shear strength |
| CE 4 | PEG-A | 0.6 | 10 | 1.0 | Coats well, but poor 70° C. shear strength |
| CE 5 | PTHF-A | 2.4 | 10 | 0.5 | Gelled, could not be coated |
| CE 6 | PTHF-A | 2.4 | 10 | 1.0 | Gelled, could not be coated |

TABLE 6

Adhesive properties of samples

| | 180° Peel Adhesion 23° C. (N/mm) | | 180° Peel Adhesion After Ageing at 65° C./90% RH Peeled at 23° C./50% RH (N/mm) | | | | | | Shear SS 70° C. |
|---|---|---|---|---|---|---|---|---|---|
| Sample | SS, | PC, | 3 day | | 7 day | | 14 day | | 1" × 1" |
| ID | 1 day | 20 min | SS | Glass | SS | Glass | SS | Glass | 500 g |
| EX 1 | 1.12 | 0.79 | 0.68 | 1.05 | 0.35 | 0.17 | 0.52 | 0.64 | 10,000+ |
| EX 2 | 0.93 | 0.67 | 0.56 | 0.63 | 0.31 | 0.19 | 0.29 | 0.41 | 10,000+ |
| EX 3 | 0.83 | 0.66 | 0.45 | 0.45 | 0.19 | 0.15 | 0.10 | 0.27 | 10,000+ |
| EX 4 | 1.01 | 0.79 | 0.71 | 0.82 | 0.40 | 0.21 | 0.49 | 0.73 | 10,000+ |
| EX 5 | 0.84 | 0.72 | 0.63 | 0.66 | 0.30 | 0.52 | 0.36 | 0.32 | 10,000+ |
| CE 1 | 1.65 | 0.26 (sho) | 0.77 | 0.45 | 0.63 | 0.90 | 0.79 | 1.33 | 10,000+ |
| CE 2 | 0.89 | 0.94 | 0.33 | 0.25 | 0.07 | 0.48 | 0.07 | 0.09 | 10,000+ |
| CE 3 | — | — | 0.31 | 0.35 | 0.43 | 0.33 | 0.46 | .80 | 460 min (coh) |
| CE 4 | — | — | 0.30 | 0.31 | 0.33 | 0.50 | 0.47 | 0.77 | 1461 min (coh) |
| CE 5 | Not Applicable - Could not be tested | | | | | | | | |
| CE 6 | | | | | | | | | |

TABLE 7

| Tensile impact of samples | | |
| --- | --- | --- |
| | Tensile Impact SS to SS 2.5 mm circle Geometry | |
| Sample ID | Total Energy (J) | Peak Force (N) |
| EX 1 | 0.60 Adh/Coh | 4323 |
| EX 2 | 0.65 Adh/Coh | 4408 |
| EX 3 | 0.83 Adh/Coh | 4664 |
| EX 4 | 0.80 Adh/Coh | 4860 |
| EX 5 | 0.88 Adh/Coh | 4473 |
| CE 1 | 0.27 Adh | 2203 |
| CE 2 | 1.16 Adh/Coh | 4433 |

What is claimed is:

1. An adhesive composition comprising:
(a) 0.5 to 20 weight percent of a first (meth) acrylate polymer based on a total weight of (meth) acrylate polymers in the adhesive composition, wherein the first (meth) acrylate polymer has a weight average molecular weight of at least 300,000 Daltons and is a polymerized product of a first polymerizable composition comprising (1) an alkyl (meth) acrylate and (2) an optional polar monomer; and
(b) 80 to 99.5 weight percent of a second (meth) acrylate polymer based on the total weight of (meth) acrylate polymers in the adhesive composition, wherein the second (meth) acrylate polymer is crosslinked and is a polymerized product of a second polymerizable composition comprising (1) an alkyl (meth) acrylate, (2) a polar monomer, (3) a poly (tetrahydrofuran) (meth) acrylate macromer, and (4) a crosslinking monomer having a plurality of (meth) acryloyl groups.

2. The adhesive composition of claim 1, wherein the first polymerizable composition comprises 60 to 99 weight percent alkyl (meth) acrylate and 1 to 40 weight percent polar monomer based on a total weight of polymerizable components in the first polymerizable composition.

3. The adhesive composition of claim 2, wherein the polar monomer comprises 1 to 15 weight percent of an acidic polar monomer and 0 to 25 weight percent of a non-acidic polar monomer based on a total weight of polymerizable components in the first polymerizable composition.

4. The adhesive composition of claim 1, wherein the second polymerizable composition comprises 25 to 95 weight percent alkyl (meth) acrylate, 0.5 to 40 weight percent polar monomers, 2 to 50 weight percent poly (tetrahydrofuran) (meth) acrylate macromer, and 0.01 to 5 weight percent crosslinking monomer having a plurality of (meth) acryloyl groups based on a total weight of polymerizable components in the second polymerizable composition.

5. The adhesive composition of claim 1, wherein the poly (tetrahydrofuran) (meth) acrylate macromer has a weight average molecular weight in a range of 500 to 12,000 Daltons.

6. The adhesive composition of claim 1, wherein the adhesive composition comprises 5 to 20 weight percent first (meth) acrylate polymer and 80 to 95 weight percent second (meth) acrylate polymer based on the total weight of (meth) acrylate polymers in the adhesive composition.

7. The adhesive composition of claim 1, wherein the adhesive composition is a pressure-sensitive adhesive.

8. An article comprising:
a) a substrate; and
b) an adhesive composition of claim 1 positioned adjacent to the substrate.

9. The article of claim 8, wherein the article is a transfer tape, a one-sided adhesive tape, a dual-sided adhesive tape, or a die-cut adhesive article.

10. The article of claim 8, wherein the article is an electronic device incorporating the adhesive composition.

11. A method of making an adhesive composition, the method comprising:
(a) providing a first polymerizable composition comprising:
(1) an alkyl (meth) acrylate; and
(2) an optional polar monomer;
(b) forming a syrup composition by partially polymerizing the first polymerizable composition, wherein the syrup composition comprises
(1) 1 to 20 weight percent of solute polymer based on a total weight of the syrup composition, the solute polymer being a first (meth) acrylate polymer having a weight average molecular weight of at least 300,000 Daltons;
(2) 80 to 99 weight percent of solvent monomers based on a total weight of the syrup, the solvent monomers comprising (i) the alkyl (meth) acrylate and (ii) the optional polar monomer; and
(c) preparing a second polymerizable composition comprising
(1) the syrup composition;
(2) a polar monomer if the syrup composition is free of the optional polar monomer;
(3) a poly (tetrahydrofuran) (meth) acrylate macromer; and
(4) a crosslinking monomer having a plurality of (meth) acryloyl groups
(d) polymerizing the second polymerizable composition to form the adhesive composition comprising (1) the first (meth) acrylate polymer and (2) a second (meth) acrylate polymer that is crosslinked.

12. An adhesive composition comprising a polymerized product of:
(a) a syrup composition comprising a partially polymerized product of a first polymerizable composition comprising (i) an alkyl (meth) acrylate and (ii) an optional polar monomer, wherein the syrup composition comprises
(1) 1 to 20 weight percent solute polymer based on a total weight of the syrup, the solute polymer being a first (meth) acrylate polymer having a weight average molecular weight of at least 300,000 Daltons; and
(2) 80 to 99 weight percent solvent monomers based on a total weight of the syrup, the solvent monomers comprising (i) the alkyl (meth) acrylate and (ii) the optional polar monomer; and
(b) a polar monomer if the syrup composition is free of the optional polar monomer; and
(c) a poly (tetrahydrofuran) (meth) acrylate macromer; and
(d) a crosslinking monomer having a plurality of (meth) acryloyl groups.

* * * * *